(No Model.)
F. H. BROWN.
INDUCTION COIL.
No. 446,730. Patented Feb. 17, 1891.
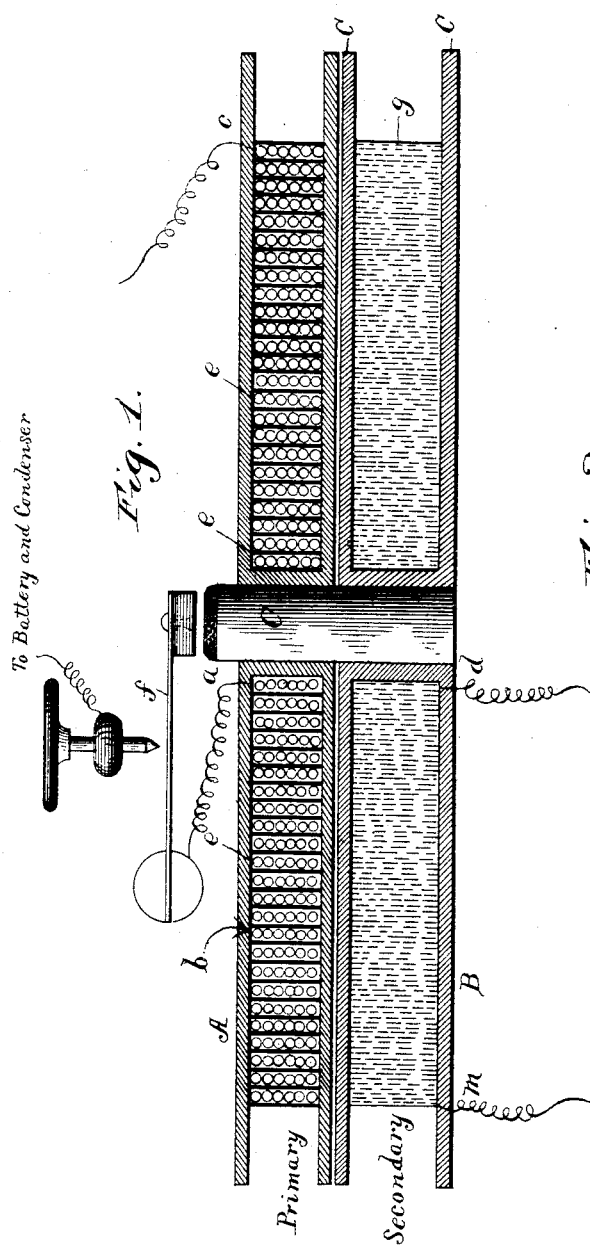
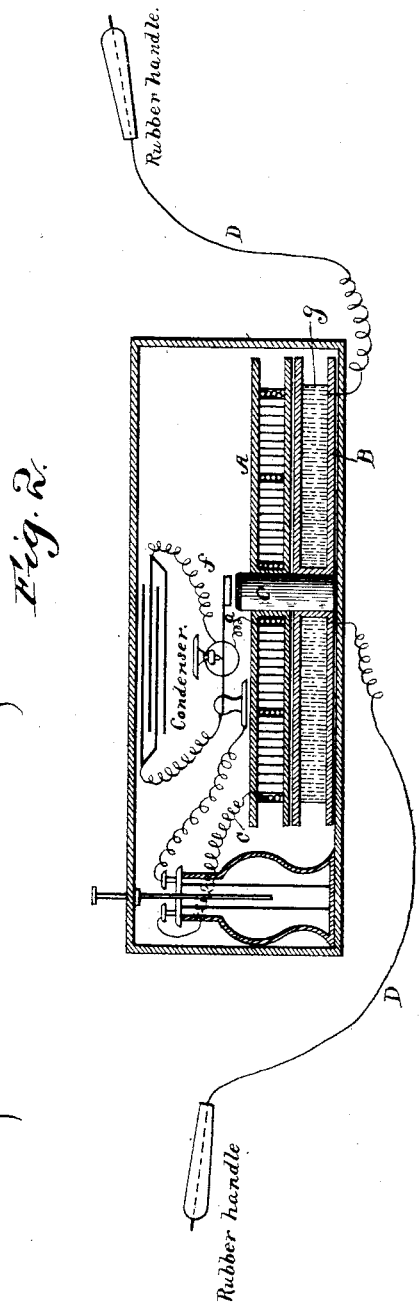
Witnesses:
J. B. McGirr
William O. Belt
Inventor:
Fred H. Brown
By J. W. Garner
Attorney
THE NORRIS PETERS CO., PHOTO-LITHO., WASHINGTON, D. C.

UNITED STATES PATENT OFFICE.

FRED H. BROWN, OF CHICAGO, ILLINOIS.

INDUCTION-COIL.

SPECIFICATION forming part of Letters Patent No. 446,730, dated February 17, 1891.

Application filed July 21, 1890. Serial No. 359,459. (No model.)

*To all whom it may concern:*

Be it known that I, FRED H. BROWN, a citizen of the United States, residing at Chicago, in the county of Cook and State of Illinois, have invented certain new and useful Improvements in Mineral-Ore Detectors; and I do hereby declare the following to be a full, clear, and exact description of the invention, such as will enable others skilled in the art to which it appertains to make and use the same.

My invention is an apparatus for detecting and locating mineral ores, and it is an improvement on the Letters Patent No. 274,882, granted to me on the 27th day of March, 1883. There, as here, a battery was combined with an induction-coil for a like result; but in the present case an efficiency is given to my invention not attempted and not possible in my former patent.

With this invention a prospector can detect and analyze ores by placing the discharges of an induction-spark coil into contact with rocks supposed to contain metals. If the rocks do contain metals, the spark will leap into and through the metals in the rocks, the metals acting as a conductor. The rocks themselves are a non-conductor. Hence if there are no metals in the rocks of course the spark will not pass through them. If there is but a small quantity or only a few atoms of metal in the rocks, the spark will utilize such atoms as a conductor and leap from one atom to another. The purer the metal and the greater its quantity in place in the rock the greater the conducting-surface offered to the spark, and accordingly the larger will be the diameter of the flame which passes into the rock. In this manner an operator can approximate the quantity of metal contained in mineral-bearing rock or ores. Furthermore, all metals have their characteristic color when burned. Silver has a green color, lead a purple or violet, zinc a light blue, iron a brilliant white, gold a bluish-white, and so on. As the mass of ores containing metals is reduced to a finely divided or powdered condition, like flour, before its metals are extracted, such ores will consume very readily. During their combustion by the spark the metals give off their characteristic colors. In this manner the operator can tell upon what kind of metals he is operating. This apparatus is invaluable to the prospector, as he can tell with positiveness whether the float or blossom contains metal or not. He can thoroughly analyze the walls of a shaft or tunnel, and it will disclose to him where to mine, and in the richest places.

In the drawings, Figure 1 represents my new induction-coil, and Fig. 2 a box with the coil and battery and condenser attached to the top or side of the box.

As a part of the construction of this mineral ore detector, there is shown a new kind of induction-coil which will enable one to make a spark-coil with much less care and trouble than the well-known form of Ruhmkorff coil, in which the windings of the secondary wire are confined to the magnetic field emanating from the core of the primary. This field is always quite limited in diameter, and hence the capacity of that style of coil is also limited; but by this invention the magnetic field is carried out from the core indefinitely. By inserting a layer or a sheet of thin Russia iron or sheet of iron between each layer of the primary wire as it is wound the primary current magnetizes the iron at each electrical impulse of the break-piece, and the secondary-wire, being in close proximity to these extended core-pieces, receives the induced current. By this method all the layers or windings are brought nearer to the inducing magnetic field, and the windings of both primary and secondary wires, as will readily be understood, can be carried out indefinitely. For the purpose desired this new coil is of an efficiency not to be excelled or equaled. It is not absolutely necessary to place the sheet-iron wrappings between each and every layer of the primary wire; but although this method is preferable good results are obtained by a fewer number of sheets of iron—as, for example, placing the sheet-iron between every alternate layer, or between every third or fourth layer.

The condenser is made in the usual way and can be placed in any position in the box in order to economize space, portability being quite an object in a mineral detector.

The spool A is constructed preferably of hard rubber, and upon it is wound the primary wire.

The core C is of fine iron wire, such as generally used, and it passes through coincident or aligned holes or passages in the centers of both spools A B of the primary and secondary coils. The primary wire passes through the spool at $a$, and it is wound continuously. Between each layer of wire is placed a thin strip $e$ of soft Russia or other iron. These layers alternate, as a layer of wire and then a strip of sheet-iron $b$, and so on continuously until the spool is filled to a sufficient extent—that is to say, the strips $e$ of iron are concentric and intermediate with the layers or coils of wire, and the said strips $e$ of iron serve to extend the magnetic field radially. Each core-strip $e$ is excited and magnetized by the primary current passing through the layers or coils of primary wire contiguous thereto, and inasmuch as any number of said strips may be employed, according to the size of the coil, the magnetic field is capable of being thus extended radially indefinitely in proportion to the length of the primary wire and the number of its convolutions or layers, and hence a coil of very great power may be readily constructed in accordance with my invention. In other words, the core, instead of being, as in the Ruhmkorff coil, confined in the center, and thereby necessarily of contracted magnetic field, is in my invention extended in parallelism with the primary convolutions, thereby extending the magnetic field radially in proportion to the length of the primary wire and the number of the convolutions thereof, hence producing a primary coil of maximum efficiency. The other end of the primary wire passes through the spool at $c$. On the other portion of the spool B, also made preferably of hard rubber, is wound the fine wire of the secondary coil $g$ for receiving the induced current, one terminal end of which passes through the spool, as at $d$, and the other terminal end, as at $m$. Thus the secondary coil is disposed within the radius of the primary coil, and is throughout its entire diameter subject to the direct influence of the radially-extended magnetic field of the primary. Sufficient projection is left at C C, so that the spark will not leap over to the primary wire. The rheotome or vibrating break-piece $f$ is connected in the usual way, and if the coil is to be used as a spark-coil a condenser is connected with the binding-post of the break-piece in the usual manner. The handles are made of hard rubber in order to operate the discharges. The pliable conducting-cords D are, for more perfect insulation, covered with rubber tubing.

I claim—

The induction-coil comprising the flat spools arranged end to end on the core, and wound, respectively, with the primary and secondary wires, the strips of iron being interposed between the layers or coils of the primary, and the rheotome or break-piece arranged to vibrate over the core and in circuit with the condenser and primary, substantially as described.

In testimony whereof I hereby subscribe my signature in presence of two witnesses.

FRED H. BROWN.

Witnesses:
JNO. J. SAFELY,
JAMES H. MANDEVILLE.